Feb. 22, 1944. U. G. FARMER ET AL 2,342,462
MANUFACTURE OF PLASTER LATH
Filed Feb. 13, 1940  2 Sheets-Sheet 1

INVENTORS
ULYSSES GRANT FARMER
FRANK H. WHEELOCK
BY Charles S. Evans
THEIR ATTORNEY Feb. 22, 1944.  U. G. FARMER ET AL  2,342,462
MANUFACTURE OF PLASTER LATH
Filed Feb. 13, 1940  2 Sheets-Sheet 2
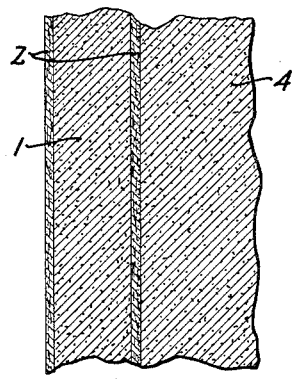
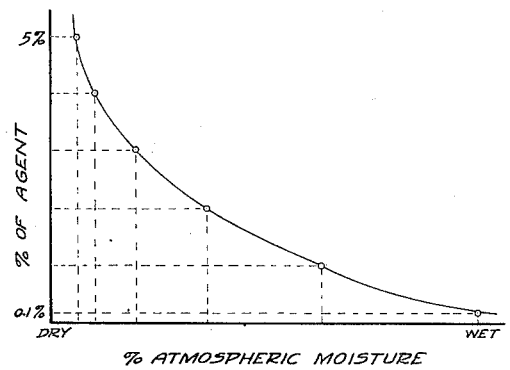
INVENTORS
ULYSSES GRANT FARMER
FRANK H. WHEELOCK
BY Charles S. Evans
THEIR ATTORNEY Patented Feb. 22, 1944

2,342,462

UNITED STATES PATENT OFFICE 2,342,462

MANUFACTURE OF PLASTER LATH

Ulysses Grant Farmer and Frank H. Wheelock, Los Angeles, Calif., assignors to Fibreboard Products Inc., San Francisco, Calif., a corporation of Delaware Application February 13, 1940, Serial No. 318,692

7 Claims. (Cl. 154—2)

Our invention relates to the manufacture of plaster lath wherein the usual fibrous sheet is sized during manufacture to obtain desired characteristics; and thereafter is treated with an agent having the property of partially neutralizing the effect of the sizing material at the surface portions of the sheet, and of imparting thereto improved properties of bonding without materially affecting other properties and characteristics of the sheet material.

In the manufacture of plaster lath it is common practice to incorporate in the fibrous sheet sizing and/or filling materials of suitable character, and in suitable amounts for obtaining desired characteristics suited to the particular service for which the material is intended to be used. The sizing materials render the sheet more or less non-absorptive, depending upon the nature and amount of the sizing material used. The property of effecting a bond with other materials applied thereto likewise varies with the nature and amount of the sizing material, an increase in the amount of sizing causing a corresponding decrease in the bonding property of the sheet. When sufficient sizing is used to attain a desired degree of hardness, strength, finish or other desired characteristic, it frequently happens that the sheet material is rendered so non-absorptive that its bonding property is seriously impaired. In such cases, it often becomes necessary to reduce the amount of sizing required for attaining a desired characteristic in order to preserve the bonding properties of the sheet to a required degree.

For example, in the case of the fibrous sheet material used for facing plaster lath, plaster wall board, and similar products (herein grouped broadly under the term "plaster lath"), it is desirable from the standpoint of hardness, strength, internal bonding and related properties to use a hard sized sheet. However, the non-absorptiveness of a hard sized sheet is such that the property of effecting a bond with plaster or other material applied thereover is seriously impaired. In addition the bonding property of the surfacing sheets is materially affected by conditions prevailing during manufacture or use.

When wet plaster or other material is applied over plaster lath, it is necessary for the coating material to slightly penetrate the adjacent surfacing sheet of the plaster lath to effect a bond therewith. The forces effective for causing such penetration and bonding are primarily those of interfacial or surface tension, particularly as manifested in capillary attraction; and are ordinarily referred to in the industry as "suction." One of the chief requirements in a commercial plaster lath product is that the surfacing sheets have an adequate degree of "suction" for effecting a bond with coating materials applied thereover. At the same time, it is essential that the surfacing sheets have sufficient strength to support the weight of the plaster coating. A hard sized sheet, for example one containing 2% or more of rosin size, has ample strength to support a plaster coating applied thereover; but such a sheet is so non-absorptive and affords so little "suction" as to render it impracticable for general use in plaster lath. On the other hand, if the amount of sizing material is reduced sufficiently to insure an effective bond under certain conditions at the time of use, the sheet may be so weakened internally that, under other conditions, the outer fibers may be pulled away from the inner fibers by the weight of the plaster. This action is referred to in the industry as "slipping," and completely destroys the bond between the plaster coating and the plaster lath throughout the areas affected.

The problem is further complicated by the fact that the tendency of the sized surfacing sheets to resist penetration of the coating material is augmented by the drying treatment to which the plaster lath is subjected during manufacture. In order to speed production and minimize costs, the fabricated lath is passed through a drier maintained at a relatively high temperature. From the view point of operative efficiency, it is desirable to maintain a high drier temperature, say about 500° to 550° F. and to move the lath at a high speed, for example about 55 feet per minute. Such a temperature rapidly dries the moisture from the fabricated lath, and in general the moisture carried by the lath is sufficient to prevent serious burning of the surfacing sheets during the drying treatment. However such high heat tends to harden the surface sheets; and the absorptiveness of the sheet material is seriously impaired, if not wholly destroyed by a glazing of the surface.

The bonding characteristics or "suction" of the finished plaster lath vary with variable conditions encountered during manufacture or use. For example, the bonding property is materially affected by the character and moisture content of the plaster filling, or of the surface sheets. Atmospheric conditions at the time of manufacture, and drier temperature variations, affect the bonding properties. Climatic conditions prevailing at the time the plaster lath is used also very materially affect the bonding properties. Thus, the "suction" effective during cold or damp weather is materially different than when the weather is hot or dry. Lath manufactured to meet the requirements of one climatic condition may be seriously defective when used under different climatic conditions.

Such difficulties have heretofore been regarded as more or less inherent in the manufacture and use of plaster lath; and have involved a material factor in cost, as well as a serious limitation as to the field of utility of such materials. The commercial product represents a compromise between conflicting factors requiring the partial sacrifice of some desirable properties in order to partially correct other incidental defects. So far as applicants are aware, no method has heretofore been devised for insuring effective bonding under all conditions ordinarily encountered in manufacture or use, or for controlling the bonding properties of plaster lath to conform to various conditions and requirements prevailing during manufacture and use.

It is, therefore, an object of our invention to provide a plaster lath having increased bonding property or "suction," and a method of treating the same to permit manufacture of the lath at high speed and under high drying temperatures without impairment of the bonding properties.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

In the drawings:

Figure 4 is an enlarged sectional view illustrating the manner in which a coating of plaster is bonded to the plaster lath.

Figure 5 is a diagrammatic graph illustrating the manner in which the percentage of surface tension reducing agent is varied to conform to various conditions of atmospheric moisture.

Figure 1:
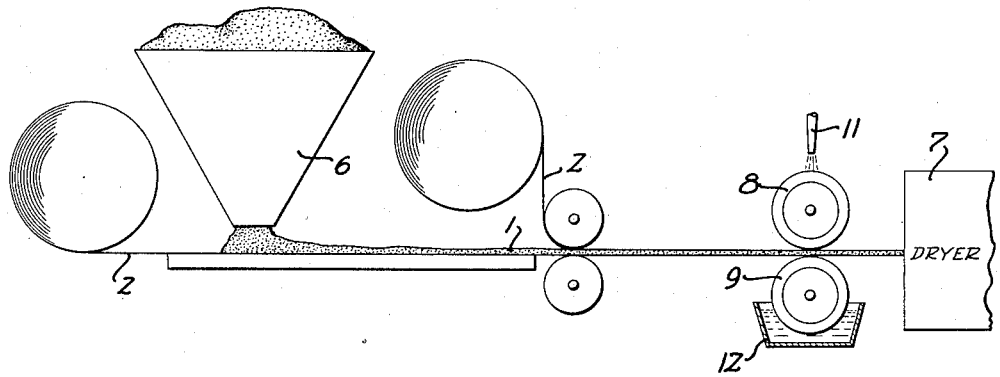
Figure 1 is a diagrammatic view of a portion of a plaster lath manufacturing apparatus, illustrating the manner in which the surface sheets are treated in accordance with our invention.

In terms of broad inclusion, the plaster lath of our invention comprises one or more thicknesses of fibrous sheet material containing a controlled amount of a suitable sizing material, and treated with an agent having the property of neutralizing the effect of the sizing material on one or both sides of the sheet to permit a wet coating applied thereto to penetrate the sheet and effect a bond therewith.

In one of its aspects our invention contemplates a plaster lath having a facing sheet of fibrous material treated with a surface tension reducing agent having the property of controlling the degree to which a plastic coating may penetrate the sheet for effecting a bond therewith.

Our invention also contemplates the method of treating the paper board surfacing sheets of plaster lath, either before or after they are applied to a plaster filler, with an agent for varying and controlling the interfacial tension effective between the surfacing sheets and wet coating material applied thereover so as to secure proper bonding thereof under various conditions prevailing during manufacture and use.

In terms of greater detail, our invention relates to the surfacing sheet or sheets 2 applied to one or both sides of the plaster filler 1 of the ordinary plaster lath. The sheets 2 are of the general character commonly used for surfacing plaster lath. Preferably the sheets contain a sufficient amount of a suitable size to produce a hard sized board. For this purpose about 2% of rosin size is preferred, but the amount and nature of the sizing material may be varied in accordance with standard practice to satisfy specific requirements.

The hard sized surfacing sheet material is treated on one or both faces with an agent having the property of at least partially neutralizing the effect of the sizing material at the surface of the sheet, and of reducing the interfacial tension effective between the sheet and wet coating material so as to reduce the non-absorptiveness at the surface of the sheet and increase its bonding property with respect to plaster or other coating material.

The agent used for treating the surfacing sheets may be any of a wide variety of materials. We prefer a material sold commercially under the trade-name "Nacconal NR," which is an alkyl aryl sulphonate. Sulphonated fatty alcohols and other wetting agents, such as those sold under the trade-names Igepon, Duponal, Gardinol, Aerosol and Alphasol, may be used with satisfactory results. In general, any wetting agent or surface tension reducing material, such as soap, powdered skimmed milk, casein, and similar materials may be used; as may also hygroscopic materials such as calcium chloride or magnesium chloride. The agent selected should have the property of reducing the surface tension of water, and of so affecting the interfacial tension between the surfacing sheets and wet coating material applied thereover as to increase the capillarity and absorptiveness of the sheet with respect to the liquid component of the coating material.

The agent may be applied to the surfacing sheets during the manufacture thereof, or during the process of manufacturing the plaster lath. Preferably the agent is applied to the surfacing sheets after the plaster lath is made and before it enters the drier. For example, in Figure 1 of the drawings we have illustrated diagrammatically a portion of a conventional plaster lath making apparatus wherein wet gypsum plaster, or similar material 1 supplied from a suitable hopper 6 is spread and rolled between upper and lower sheets 2 of fibrous surfacing material. As the fabricated lath approaches the drier 7, the surfacing sheets 2 are treated with the surface tension reducing agent, preferably in water solution of a strength calculated in accordance with the prevailing conditions of manufacture and/or the conditions under which the fabricated lath is intended to be used.

In general, a solution containing from one-tenth of one percent to five percent of the surface tension reducing agent may be used. If the material 1 contains a high percentage of moisture such that the full period of treatment in the drier 7 is necessary to dry the lath, a low percentage solution may be used. If however, the material 1 contains a relatively low percentage of moisture, or if the temperature of the drier and the period of the drying operation is such as to expose the fabricated lath to high heat after the moisture content has been substantially fully expelled, a higher percentage solution should be used.

For average purposes, a solution containing 1% to 2½% of the surface tension reducing agent is preferred. The strength of the solution is varied in accordance with the requirements of various atmospheric conditions in which the plaster lath is intended for use. The graph, Figure 5, illustrates diagrammatically the manner in which the amount of the surface tension reducing agent should be varied to conform to various conditions of atmospheric moisture at the intended time and place of use. Thus, where the plaster lath is intended for use in wet atmospheric conditions, only a small amount of the surface tension reducing agent is required; and under those conditions a greater amount of the agent should be avoided because it would cause excessive absorption of atmospheric moisture such as to preclude an adequate penetration of plaster subsequently applied to the lath. When the lath is intended for use in dry atmospheric conditions, the amount of the surface tension reducing agent should be substantially increased to insure adequate penetration of the coating material into the surface of the sheet 2. The graph of Figure 5 is purely diagrammatic, and is not based on actual computations of percentage strengths of solution and degrees of atmospheric moisture, but illustrates merely the general trend of the variation which in practice must also be varied to conform to other conditions affecting the properties of the finished product.

The surface tension reducing agent may be applied in any convenient manner. For example, felt covered rollers 8 and 9 may be mounted and driven in any convenient manner to engage the surfacing sheets 2 before the plaster lath enters the drier 7. The agent may be sprayed onto the upper roller 8 through a suitable nozzle 11, while the lower roller 9 runs in a trough 12 of the solution. The agent solution may be sprayed, or painted or otherwise applied directly to the sheets 2 in any convenient manner.

The bonding properties of the surfacing sheets in the finished plaster lath may be effectively controlled by varying the amount and/or strength of the agent solution. Thus, applicants have found that when plaster lath of ordinary composition and wetness is passed through a drier in which the temperature is maintained at 500° F. to 550° F., the bonding property of the lath with respect to a plaster coating applied thereover is substantially destroyed. By moistening the surface of the sheets with a 2% to 2½% solution of "Nacconal NR" before the lath enters the drier, the plaster lath emerges in a condition such that the surfacing sheets will readily absorb moisture at their surfaces. When wet plaster 4 is applied over the surfacing sheets, as indicated in Figure 4, the interfacial tension is such that moisture is absorbed from the coating, and to a limited extent solid particles of the coating are drawn into the pores of the sheets. As the plaster dries, it becomes firmly bonded to the plaster lath. The absorptiveness of the surfacing sheets, and hence the bonding property, may be increased or decreased as desired to suit various requirements. By increasing or decreasing the strength of the agent solution, the lath may be caused to have a desired degree of absorptiveness regardless of the prevailing conditions of manufacture, as well as to suit the requirements of any use for which the material is intended.

Figure 2:
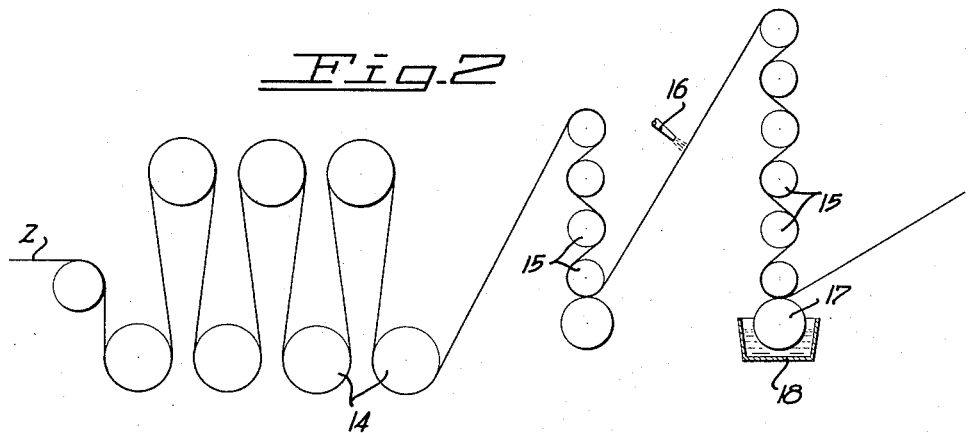
Figure 2 is a diagrammatic view of a portion of the apparatus for manufacturing fibrous sheet material, illustrating the manner in which the sheets may be pretreated for subsequent use in plaster lath, or for other purposes.
Figure 3:
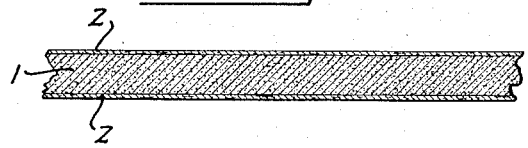
Figure 3 is an enlarged sectional view of a piece of the plaster lath of our invention.

Instead of treating the surfacing sheets with the surface tension reducing agent during manufacture of the plaster lath, the agent may be applied to the sheets during the initial manufacture thereof. Thus, Figure 2 illustrates diagrammatically a portion of the sheet manufacturing apparatus. The sheet material 2 is passed over a succession of rolls 14 and 15 by which the sheet is dried and calendered. The surface tension reducing agent may be applied at substantially any point along the course of the sheet as it passes the rolls 14 and 15. For example, the agent solution may be sprayed or otherwise applied to the sheet at any convenient point by a nozzle 16. Instead of spraying, the sheet may be moistened by a roller 17 operating in a trough 18 containing the agent; or other suitable moistening means may be provided. The point and manner of applying the agent solution may be selected in accordance with the form and arrangement of the sheet-making apparatus so as to apply the agent without interference with the normal operation of the apparatus; and with a minimum of added equipment.

When the agent is so applied to the sheet material, it has been found that plaster lath subsequently surfaced with the sheet material will emerge from the drier 7 with absorptive and bonding properties substantially equal to those imparted to the lath when the agent is applied to the sheets after the plaster lath is formed therefrom. By varying the percentage of the surface tension reducing agent, the properties of the finished plaster lath made from the pretreated sheet material may be controlled in the same manner and in like degree as when the agent is applied to the fabricated plaster lath.

In either case, the surface tension reducing agent affects only the outer portions of the sheets 2, so as to overcome the non-absorptiveness caused by the sizing material to a limited depth without affecting the sizing in the mid-thickness of the sheet. Thus, the center of the sheet retains its hard sized characteristics, and the outer fibers of the sheet are effectively held in bonded relation to the inner fibers. As a result, the sheet material 2 affords the advantages of a hard sized sheet while obtaining the "suction" or bonding characteristics of a sheet containing a substantially less amount of size.

It has also been found that the agent causes a slight swelling of the sheet. For example, a sheet which, if untreated would have a thickness of .020 point, is expanded by treatment with the surface tension reducing agent to about .023 point. Thus a sheet of increased thickness is obtained without increase in the weight of stock. Since the plaster lath is made to meet standard specifications as to thickness, the increased thickness obtained by treating the sheet in accordance with our invention permits the use of a lighter weight of surface sheet, or a thinner filler of plaster, either of which is reflected in a reduction in manfacturing cost. Because of the swelling and the resulting increase in porosity and absorptiveness of the sheet material, the relatively dense sheet made upon a cylinder machine may be used for the surfacing sheets with results comparable to that obtained by the less dense product produced upon a Fourdrinier machine.

Where reference is made herein to the property of absorption or absorptiveness, it is to be understood that the properties of adsorption may also be involved; and that the terminology as herein used in reference to absorption is intended to include also the property of adsorption.

I claim:

1. The method of making plaster lath which comprises surfacing a sheet of wet plaster with fibrous sheet material which in its normal condition is absorptive, passing the combined sheets through a drying atmosphere to condition the plaster material at a speed and temperature tending to glaze the surface and destroy the absorptiveness of the fibrous sheet material, and applying to the fibrous sheet material before glazing thereof is started an aqueous solution of an organic wetting agent having the property of counteracting impairment of the absorptiveness thereof by the drying temperature.

2. In the method of making plaster lath comprising conjoined sheets of plaster and absorbent fibrous material which method requires heat treatment of the conjoined sheets to condition the plaster at a speed and temperature tending to glaze the fibrous sheet and destroy the absorptiveness thereof, the step which consists in applying to the fibrous sheet during the course of manufacture of the lath an aqueous solution of an organic wetting agent to counteract non-absorptiveness of the fibrous sheet due to the heat treatment.

3. The method of making plaster lath, which comprises surfacing a sheet of wet gypsum plaster with fibrous sheet material which in its normal condition is absorptive, subjecting the combined sheets to a temperature of about 500° F. whereby the lath is dried, the temperature of drying tending to destroy the absorptiveness of the fibrous sheet material and to form a glaze on the surface thereof, and applying an aqueous solution of an organic wetting agent to the surface of said fibrous sheet material, said agent being capable of substantially reducing the surface tension of water and counteracting the impairment of the absorptiveness produced by the drying temperature, said agent being applied after the plaster and fibrous sheets are united and before they are subjected to the drying temperature.

4. An article of manufacture comprising a layer of gypsum plaster, a normally absorbent fibrous sheet dried with and bonded to a surface of the plaster layer, said fibrous sheet being characterized by a substantially glazed surface due to the drying temperature and which tends to destroy the absorptiveness thereof, and an agent selected from the class consisting of sulphonated organic compounds, soap, casein, and hygroscopic inorganic salts, carried by the surface fibers of the fibrous sheet and effective for counteracting non-absorptiveness due to said glazed surface.

5. In plaster lath, the combination with a layer of plaster, of a surfacing sheet of fibrous material having a substantially glazed surface resulting from heat treatment of the lath for drying and conditioning of the same, an organic wetting agent carried by the fibrous sheet to counteract non-absorptiveness of the sheet due to said glazed surface.

6. The method of making plaster lath which comprises surfacing a sheet of wet plaster with a sheet of fibrous material having absorptive properties which are subject to impairment when dried with the plaster at a temperature tending to form a glazed surface on the fibrous material, applying an aqueous solution of an organic wetting agent to the surface of the fibrous material before it is applied to the wet plaster, and passing the combined sheets through a drying atmosphere at a speed and at a temperature sufficiently high to tend to destroy the absorptiveness of the fibrous material and to form a glaze on the surface thereof, the wetting agent being carried by the surfacing sheet in a quantity sufficient to counteract non-absorptiveness normally resulting from such drying treatment.

7. An article of manufacture comprising a layer of plaster, a fibrous sheet bonded to a surface of said plaster, said fibrous sheet being normally absorbent but having a substantially heat-glazed, water-repellent surface which tends materially to decrease the absorptiveness of said fibrous sheet, and a wetting agent selected from the group consisting of organic wetting agents and inorganic hygroscopic salts, deposited in the surface layers of said fibrous sheet, said agent being present in amounts sufficient effectively to counteract the impairment of the normal absorptiveness of said fibrous sheet due to said heat-glazed, water-repellent surface.

ULYSSES GRANT FARMER.
FRANK H. WHEELOCK.